(12) United States Patent
Kawasaki et al.

(10) Patent No.: US 8,730,646 B2
(45) Date of Patent: *May 20, 2014

(54) LAMINATED ELECTRONIC COMPONENT AND METHOD FOR MANUFACTURING THE SAME

(75) Inventors: Kenichi Kawasaki, Echizen (JP); Shunsuke Takeuchi, Echizen (JP); Akihiro Motoki, Fukui (JP); Makoto Ogawa, Fukui (JP); Toshiyuki Iwanaga, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/466,435

(22) Filed: May 15, 2009

(65) Prior Publication Data
US 2009/0291317 A1 Nov. 26, 2009

(30) Foreign Application Priority Data
May 21, 2008 (JP) ................. 2008-132871

(51) Int. Cl.
*H01G 4/008* (2006.01)
*H01G 2/20* (2006.01)
*H01G 4/228* (2006.01)

(52) U.S. Cl.
USPC .............. 361/305; 361/308.1; 361/309

(58) Field of Classification Search
USPC ............... 361/306.1, 308.1, 309, 305
See application file for complete search history.

(56) References Cited

U.S. PATENT DOCUMENTS

| | | | |
|---|---|---|---|
| 6,295,196 B1 * | 9/2001 | Hamaji et al. | 361/321.2 |
| 6,510,040 B1 * | 1/2003 | Sato et al. | 361/321.4 |
| 6,663,798 B2 * | 12/2003 | Sato et al. | 252/512 |
| 6,673,272 B2 * | 1/2004 | Miyazaki et al. | 252/507 |
| 6,927,966 B2 * | 8/2005 | Miyazaki et al. | 361/321.2 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 6,982,864 B1 * | 1/2006 | Sridharan et al. | 361/321.1 |
| 7,067,172 B2 | 6/2006 | Ritter et al. | |

(Continued)

FOREIGN PATENT DOCUMENTS

WO 2007/049456 A1 5/2007
WO 2008/023496 A1 2/2008

OTHER PUBLICATIONS

Takeuchi et al.; "Laminated Electronic Component and Method for Manufacturing the Same"; U.S. Appl. No. 12/466,393, filed May 15, 2009.

(Continued)

*Primary Examiner* — Cathy Lam
(74) *Attorney, Agent, or Firm* — Keating & Bennett, LLP

(57) ABSTRACT

A laminated electronic component includes outer terminal electrodes including lower plating films including metal particles having an average size of 0.5 μm or less, the lower plating films being formed by directly plating an outer surface of an electronic component body such that the lower plating films are electrically connected to exposed portions of inner conductors. The outer terminal electrodes may further include upper plating films formed on the lower plating films, the upper plating films being defined by one or more layers. Metal particles defining the upper plating films may have an average size of 0.5 μm or less. The metal particles defining the lower plating films may be Cu particles.

11 Claims, 9 Drawing Sheets

(56) References Cited

U.S. PATENT DOCUMENTS

| | | |
|---|---|---|
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,285,232 B2 * | 10/2007 | Miki .............. 252/514 |
| 7,344,981 B2 | 3/2008 | Ritter et al. |
| 7,345,868 B2 | 3/2008 | Trinh |
| 7,463,474 B2 | 12/2008 | Ritter et al. |
| 7,764,484 B2 * | 7/2010 | Motoki et al. ........... 361/306.1 |
| 2005/0046536 A1 | 3/2005 | Ritter et al. |
| 2008/0123248 A1 | 5/2008 | Kunishi et al. |
| 2008/0145551 A1 | 6/2008 | Kunishi et al. |
| 2008/0158774 A1 | 7/2008 | Trinh |
| 2008/0210564 A1 | 9/2008 | Motoki et al. |
| 2008/0239617 A1 | 10/2008 | Motoki et al. |
| 2009/0052114 A1 | 2/2009 | Motoki et al. |

OTHER PUBLICATIONS

Kayatani et al.; "Multilayer Ceramic Electronic Component and Method for Making the Same"; U.S. Appl. No. 12/469,799, filed May 21, 2009.

Ogawa et al., "Laminated Electronic Component", U.S. Appl. No. 12/943,072, filed Nov. 10, 2010.

* cited by examiner

LAMINATED ELECTRONIC COMPONENT AND METHOD FOR MANUFACTURING THE SAME

BACKGROUND OF THE INVENTION

1. Field of the Invention

The present invention relates to a laminated electronic component and a method for manufacturing the laminated electronic component. In particular, the present invention relates to a laminated electronic component including an inner conductor and an outer terminal electrode connected to the inner conductor and formed at least by directly plating an outer surface of an electronic component body, and a method for manufacturing the laminated electronic component.

2. Description of the Related Art

In recent years, the market of compact portable electronic devices such as cellular phones, notebook computers, digital cameras, and digital audio devices has been expanding. These portable electronic devices have been reduced in size and also improved in performance. Such portable electronic devices include a large number of laminated ceramic electronic components. There is a demand for laminated ceramic electronic components that have a reduced size and improved performance. For example, there is a demand for laminated ceramic capacitors that have a smaller size and a higher capacitance.

One technique for effectively obtaining a laminated ceramic capacitor that has a smaller size and a higher capacitance is to reduce the thickness of a ceramic layer. Recently, capacitors having a ceramic layer with a thickness of about 3 µm or less have been produced for commercial use. At present, an even thinner ceramic layer is being pursued. However, since a thinner ceramic layer results in a higher possibility of short circuiting between inner electrodes, it is difficult to produce laminated ceramic capacitors having sufficient quality.

Another technique for effectively producing a laminated ceramic capacitor that has a smaller size and a higher capacitance is to increase the effective area of inner electrodes. However, when laminated ceramic capacitors are produced in volume, side margins between inner electrodes and the side surfaces of a ceramic assembly and end margins between the inner electrodes and the end surfaces of the ceramic assembly are required to compensate for displacement occurring among laminated ceramic green sheets and displacement caused by cutting of the laminated ceramic green sheets. Thus, to increase the effective area of inner electrodes while maintaining the margins, the area of each ceramic layer must be increased. However, an increase in the area of each ceramic layer is restricted by set dimensional specifications of a product. Additionally, the thickness of outer terminal electrodes prevents an increase in the area of each ceramic layer.

Outer terminal electrodes of laminated ceramic capacitors have been formed by applying a conductive paste to the end surfaces of a ceramic assembly and firing the applied conductive paste. Typically, a conductive paste is applied by immersing an end surface of a ceramic assembly into a paste bath and removing the ceramic assembly from the paste bath. Unfortunately, this method tends to produce a thick application of the conductive paste in the central portions of the end surfaces of a ceramic assembly due to the viscosity of the conductive paste. As a result, outer terminal electrodes have thick portions (specifically, the thickness exceeds about 30 µm). Thus, the area of each ceramic layer has to be reduced in accordance with the increase in the thickness of the outer terminal electrodes.

To overcome this problem, a method has been proposed in which outer terminal electrodes are formed by direct plating. In this method, a plating film is deposited using the exposed portions of inner electrodes on an end surface of a ceramic assembly as nuclei. Growth of the plating film results in neighboring exposed portions of inner electrodes being connected to each other. Electrode films formed by this method are thinner and flatter than electrode films formed by existing electrode film formation methods using conductive pastes (see, for example, International Publication No. WO 2007/049456).

However, the formation of outer terminal electrodes by direct plating causes a problem. Specifically, when an outer terminal electrode is formed by directly plating an outer surface of an electronic component body (ceramic assembly) and the resultant plating film defining the outer terminal electrode is includes metal particles having a large average size, such as 1 µm or more, the number of gaps formed at grain boundaries, which channels for moisture to escape, is decreased. When the electronic component body is heat treated to remove moisture, hydrogen molecules, and hydrogen ion from the inside of the electronic component body, these substances tend to remain inside the electronic component body. Use of such an electronic component body results in decreased reliability. For example, the properties, such as insulation resistance, degrade with the passage of usage time.

SUMMARY OF THE INVENTION

To overcome the problems described above, preferred embodiments of the present invention provide a laminated electronic component including an outer terminal electrode that is directly plated an outer surface of the body of the electronic component, the laminated electronic component having a low probability of degraded properties of the laminated electronic component and having a high durability, and a method for manufacturing such a laminated electronic component.

According to a preferred embodiment of the present invention, a laminated electronic component includes an electronic component body including a plurality of laminated functional layers, an inner conductor provided in the electronic component body and including a portion exposed at an outer surface of the electronic component body, and an outer terminal electrode provided on the outer surface of the electronic component body such that the outer terminal electrode is electrically connected to the inner conductor and the outer terminal electrode covers the exposed portion of the inner conductor, wherein the outer terminal electrode includes a lower plating film that is directly plated on the outer surface of the electronic component body so as to cover the exposed portion of the inner conductor, and metal particles defining the lower plating film have an average size of about 0.5 µm or less.

Preferably, the outer terminal electrode may further include an upper plating film provided on the lower plating film, and the upper plating film includes at least one layer.

Metal particles defining the upper plating film preferably have an average size of about 0.5 µm or less, for example.

Metal particles defining the upper plating film preferably have an average size substantially equal to or less than the average size of the metal particles defining the lower plating film, for example.

The metal particles defining the lower plating film are preferably Cu particles, for example.

According to a preferred embodiment of the present invention, a method for manufacturing a laminated electronic component including an electronic component body formed by laminating a plurality of functional layers, an inner conductor formed in the electronic component body and including a portion exposed at an outer surface of the electronic component body, and an outer terminal electrode formed on the outer surface of the electronic component body such that the outer terminal electrode is electrically connected to the inner conductor and the outer terminal electrode covers the exposed portion of the inner conductor, the method includes a step of forming the outer terminal electrode on the electronic component body, the step including a substep of forming a lower plating film composed of metal particles having an average size of about 0.5 µm or less by directly plating the outer surface of the electronic component body such that the lower plating film covers the exposed portion of the inner conductor, and a step of heat-treating the electronic component body after the lower plating film is formed.

The heat-treatment step is preferably conducted at a temperature of about 150° C. to about 500° C., for example.

According to a preferred embodiment of the present invention, a laminated electronic component includes an electronic component body including a plurality of laminated functional layers, an inner conductor provided in the electronic component body and including a portion exposed at an outer surface of the electronic component body, and an outer terminal electrode arranged such that the outer terminal electrode is electrically connected to the inner conductor and the outer terminal electrode covers the exposed portion of the inner conductor, wherein the outer terminal electrode includes a lower plating film that is directly plated on outer surface of the electronic component body so as to cover the exposed portion of the inner conductor, and metal particles defining the lower plating film have an average size of about 0.5 µm or less. When such a laminated electronic component is subjected to a heat treatment, moisture, hydrogen molecules, hydrogen ions, and other contaminants inside the electronic component body are efficiently removed, thereby providing a laminated electronic component with high reliability.

Specifically, when metal particles defining the lower plating film have an average size exceeding about 0.5 µm, channels for removing moisture and other contaminants from the inside of the electronic component body are not sufficiently provided and, as a result, moisture and other contaminants are not sufficiently removed from the inside of the electronic component body by heat treatment. In contrast, when metal particles defining the lower plating film have an average size of about 0.5 µm or less, channels for removing moisture and other contaminants are sufficiently provided. As a result, moisture and other contaminants inside the electronic component body can be efficiently removed.

Preferably, the lower plating film can be formed, for example, by a method of forming a strike plating film composed of metal particles having an average size of about 0.5 µm or less on a surface of the electronic component body and subsequently forming a thick plating film composed of metal particles having an average size of about 0.5 µm or less on the strike plating film, a method of forming a strike plating film composed of metal particles having an average size of about 0.5 µm or less on a surface of the electronic component body by strike plating and using the strike plating film as the lower plating film, or a method of subjecting a surface of the electronic component body to a pretreatment and subsequently forming a thick plating film composed of metal particles having an average size of about 0.5 µm or less directly on the surface of the electronic component body. However, the lower plating film is not particularly restricted in terms of a method for forming the lower plating film and the configuration of the lower plating film.

When the outer terminal electrode includes a lower plating film and an upper plating film defined by at least one layer on the lower plating film and the upper plating film is combined with the lower plating film by appropriately selecting the type of the upper plating film, properties such as solder wettability and a solder barrier function can be provided to the outer terminal electrode while the sufficient ease with which moisture and other contaminants are removed is maintained. Thus, a laminated electronic component having improved properties can be obtained.

In general, a material for forming a plating film defining the outermost layer of the upper plating film is selected from metal materials in accordance with the mounting arrangement of the laminated electronic component. For example, when the laminated electronic component is mounted by soldering, Sn may preferably be used. When the laminated electronic component is mounted by wire bonding, Au may preferably be used. When the laminated electronic component is embedded in a substrate, Cu may preferably be used.

According to a preferred embodiment of the present invention, a method for manufacturing a laminated electronic component includes a step of forming an outer terminal electrode on an electronic component body, the step including a substep of forming a lower plating film composed of metal particles having an average size of about 0.5 µm or less by directly plating an outer surface of the electronic component body such that the lower plating film covers an exposed portion of an inner conductor. This method provides sufficient formation of gaps at grain boundaries, that is, sufficient formation of channels for removing moisture and other contaminants from the inside of the electronic component body, as compared to forming the lower plating film composed of metal particles having an average size exceeding about 0.5 µm. As a result, the reliability of the laminated electronic component against moisture can be improved.

Metal particles defining the upper plating film preferably have an average size substantially equal to or less than the average size of the metal particles defining the lower plating film, for example. When moisture and other contaminants are removed from the inside of a capacitor body, the driving force of vaporization decreases from the lower plating film to the upper plating film. In this case, the formation of the upper plating film composed of small metal particles increases the number of channels for removing moisture and other contaminants, thereby promoting removal of moisture and other contaminants.

When the upper plating film is defined by a plurality of plating subfilms, the upper plating film is preferably formed such that the size of metal particles defining the plating subfilms gradually decreases in the upward direction.

According to a preferred embodiment of the present invention, the metal particles defining the lower plating film are preferably Cu particles, for example. This is because Cu has a good film formation property (high ductility), excellent resistance to oxidation, good bondability with inner electrodes (particularly, high diffusibility with Ni), a high density (a low recrystallization temperature), and other advantageous properties.

According to a preferred embodiment of the present invention, a method for manufacturing a laminated electronic component includes a step of forming an outer terminal electrode on an electronic component body, the step including a substep of forming a lower plating film composed of metal particles having an average size of about 0.5 µm or less by directly plating an outer surface of the electronic component body such that the lower plating film covers an exposed portion of an inner conductor. This method produces an increase in the number of channels for removing moisture and other contaminants from the inside of the electronic component body, the channels being formed at grain boundaries. As a result, moisture and other contaminants can be efficiently removed from the inside of the electronic component body, and thus, laminated electronic components having high reliability can be efficiently manufactured.

According to a preferred embodiment of the present invention, by performing the heat-treatment step at a temperature of about 150° C. to about 500° C., moisture and other contaminants can be more efficiently removed from the inside of the electronic component body, thus more effectively providing the advantages.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, the features of the present invention are described in detail with reference to preferred embodiments thereof.

First Preferred Embodiment

A first preferred embodiment of the present invention is described with an example of a laminated electronic component, that is, a two-terminal laminated ceramic capacitor including a pair of outer terminal electrodes each defined by a Cu monolayer plating film.

Figure 1:
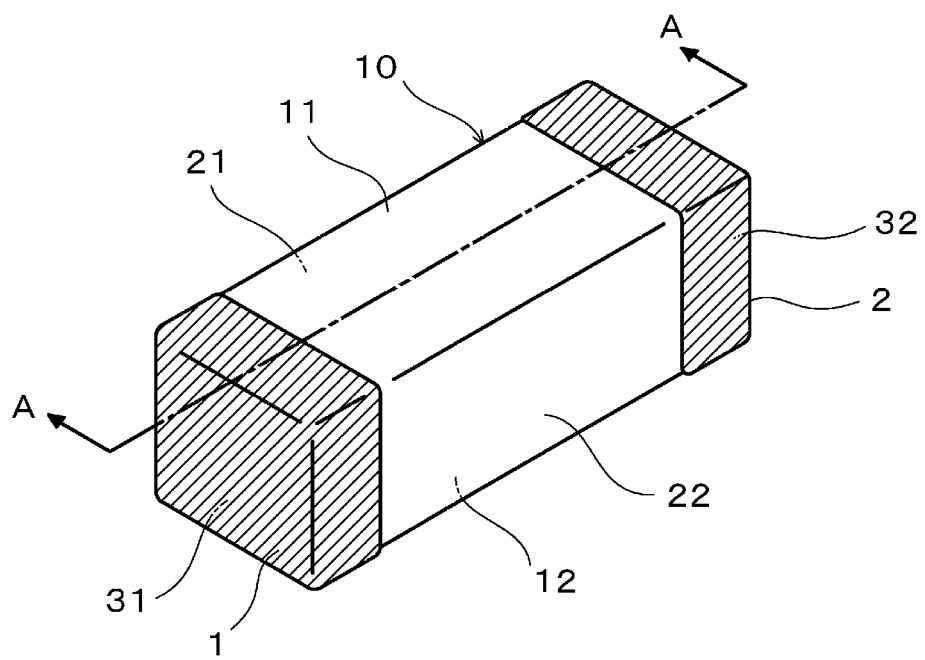
FIG. 1 is a perspective view showing the outer configuration of a laminated electronic component according to a first preferred embodiment of the present invention.
Figure 2:
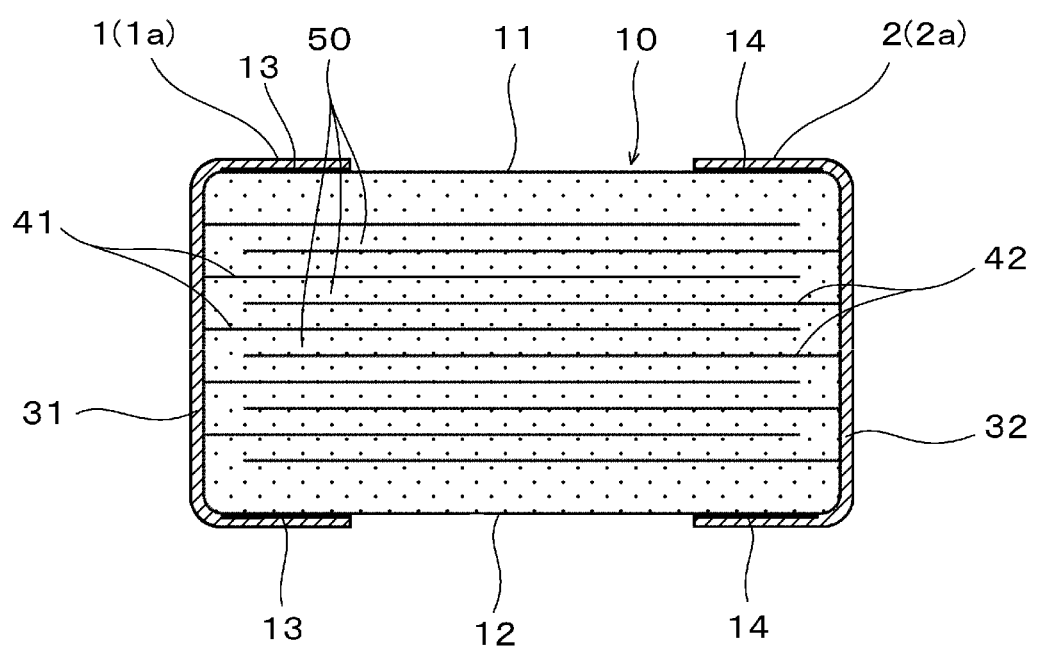
FIG. 2 is a section view taken along section line A-A in FIG. 1.
Figure 3:
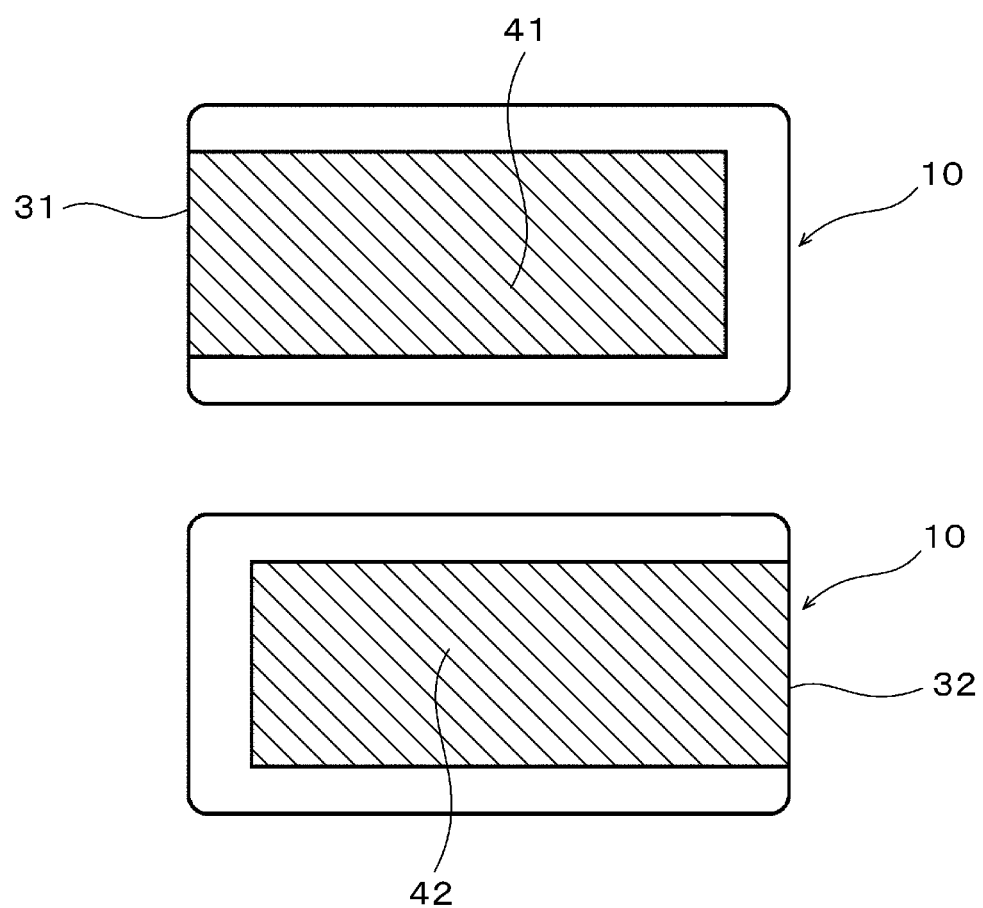
FIG. 3 shows patterns of inner electrodes of the laminated ceramic capacitor according to the first preferred embodiment of the present invention.
Figure 4:
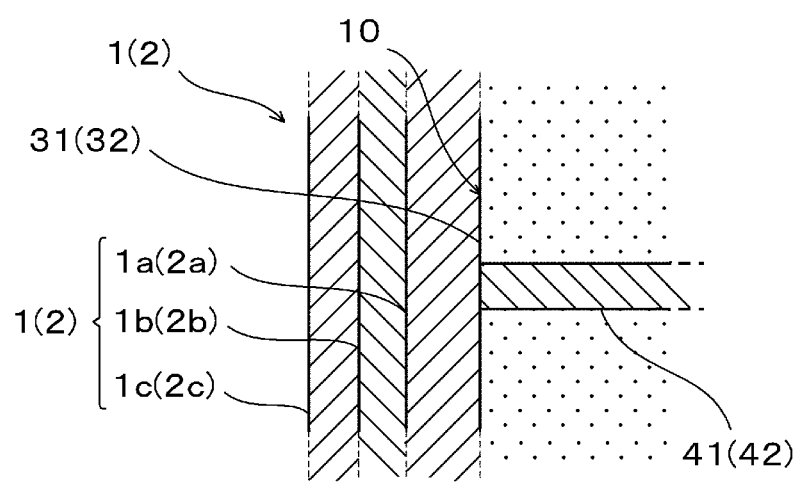
FIG. 4 is an enlarged view showing the configuration of a main portion of the laminated ceramic capacitor according to the first preferred embodiment of the present invention.

FIG. 1 is a perspective view showing the outer configuration of a laminated ceramic capacitor according to the first preferred embodiment of the present invention. FIG. 2 is a section view taken along section line A-A in FIG. 1. FIG. 3 shows patterns of inner electrodes of the laminated ceramic capacitor. FIG. 4 is an enlarged view of a main portion at which an outer terminal electrode is connected to an inner electrode.

Referring to FIG. 1, the laminated ceramic capacitor includes a capacitor body 10 that is a substantially rectangular parallelepiped and includes a first main surface 11 and a second main surface 12 facing each other, a first side surface 21 and a second side surface 22 facing each other, and a first end surface 31 and a second end surface 32 facing each other. Referring to FIG. 2, the capacitor body 10 includes a plurality of dielectric layers 50 that are laminated together.

A first outer terminal electrode 1 is provided on the first end surface 31. A second outer terminal electrode 2 is provided on the second end surface 32. The first outer terminal electrode 1 and the second outer terminal electrode 2 are electrically insulated from each other.

First surface conductors 13 and second surface conductors 14 are provided on the first main surface 11 and the second main surface 12. The first surface conductors 13 support the end portions of the first outer terminal electrode 1. The second surface conductors 14 support the end portions of the second outer terminal electrode 2. The first surface conductors 13 and the second surface conductors 14 may also be formed on the first side surface 21 and the second side surface 22. When long end portions are not required for the first outer terminal electrode 1 and the second outer terminal electrode 2, the first surface conductors 13 and the second surface conductors 14 are not necessary.

As shown in FIG. 2, first inner electrodes 41 and second inner electrodes 42 are arranged in the capacitor body 10 such that the first inner electrodes 41 face the second inner electrodes 42 with the dielectric layers 50 therebetween. Referring to FIG. 3, the first inner electrodes 41 extend to and are exposed at the first end surface 31 and are electrically connected to the first outer terminal electrode 1. The second inner electrodes 42 extend to and are exposed at the second end surface 32 and are electrically connected to the second outer terminal electrode 2.

Referring to FIG. 4, the first outer terminal electrode 1 (and similarly, the second outer terminal electrode 2) includes a lower plating film 1a (2a) including a Cu plating film and an upper plating film defined by a first upper plating film 1b (2b) including a Ni plating film and a second upper plating film 1c (2c) composed of a Sn plating film, for example.

FIG. 4 shows a main portion at which the first outer terminal electrode 1 provided on the first end surface 31 of the capacitor body 10 is connected to the first inner electrodes 41. Since this portion and a portion at which the second outer terminal electrode 2 (see FIGS. 1 and 2) is connected to the second inner electrodes 42 are symmetric, FIG. 4 is also used to show the latter portion with reference to the numerals in parentheses, i.e., the lower plating film 2a, the first upper plating film 2b, and the second upper plating film 2c that define the second outer terminal electrode 2 and the second inner electrode 42.

As shown in FIG. 4, the outer terminal electrode 1 (2) of the laminated ceramic capacitor according to the first preferred embodiment has a trilayer structure defined by the lower plating film 1a (2a), the first upper plating film 1b (2b), and the second upper plating film 1c (2c).

Metal particles defining the lower plating film 1a (2a), the first upper plating film 1b (2b), and the second upper plating film 1c (2c) preferably have an average particle size of about 0.5 μm or less, for example.

In the first preferred embodiment, the lower plating film 1a (2a) is defined by a Cu strike plating film directly formed by strike plating on the end surface 31 (32) of the capacitor body 10 and a thick Cu plating film formed on the Cu strike plating film. Alternatively, the lower plating film 1a (2a) can preferably be defined only by a Cu strike plating film, or a thick Cu plating film formed directly on an end surface of the capacitor body 10 without any Cu strike plating film. In either case, plating films (Cu strike plating film and/or thick Cu plating film) defining the lower plating film 1a (2a) must be composed of Cu particles having an average size of about 0.5 µm or less because the presence of a plating film composed of Cu particles having an average size larger than about 0.5 µm among the plating film(s) defining the lower plating film 1a (2a) results in an insufficient number of channels for removing moisture and other contaminants in the plating film, thereby reducing the removal of moisture and other contaminants.

This is also true for the first upper plating film 1b (2b) and the second upper plating film 1c (2c). These plating films defining the upper plating film should preferably be composed of metal particles having an average size of about 0.5 µm or less, for example.

The lower plating film and the upper plating film are preferably composed of a single metal selected from the group consisting of Cu, Ni, Sn, Pb, Au, Ag, Pd, Bi, and Zn or an alloy including the metal, for example.

In the laminated ceramic capacitor of the first preferred embodiment, the lower plating film 1a (2a) composed of a Cu plating film functions to promote removal of moisture and other contaminants from the inside of the laminated ceramic capacitor.

The first upper plating film 1b (2b) composed of a Ni plating film functions as a solder barrier.

The second upper plating film 1c (2c) composed of a Sn plating film functions to provide sufficient solder wettability.

In preferred embodiments of the present invention, a plating film (second upper plating film 1c (2c) in the first preferred embodiment) defining the outermost layer of the upper plating film is preferably made of a metal material appropriately selected in accordance with mounting arrangement of a product. For example, when the product (herein, a laminated ceramic capacitor) is mounted by wire bonding, Au can preferably be used, for example. When the product is to be embedded in a substrate, Cu can preferably be used, for example.

Hereinafter, preferred material properties, thicknesses, and other characteristics are described in terms of the dielectric layers, the first inner electrodes and the second inner electrodes that define inner conductors, and the outer terminal electrodes that define the laminated ceramic capacitor.

Dielectric Layer

The dielectric layers may preferably be composed of a dielectric ceramic primarily composed of $BaTiO_3$, $CaTiO_3$, $SrTiO_3$, $CaZrO_3$, for example. Alternatively, the dielectric layers may also be composed of a mixture of such a main component and an auxiliary component such as a Mn compound, an Fe compound, a Cr compound, a Co compound, or a Ni compound, for example.

Each of the dielectric layers after being fired preferably has a thickness of about 1 µm to 10 µm, for example.

Inner Electrode

The inner electrodes may preferably be composed of Ni, Cu, Ag, Pd, an Ag—Pd alloy, Au, for example.

Each of the inner electrodes after being fired preferably has a thickness of about 0.5 µm to 2.0 µm, for example.

Outer Terminal Electrode

The lower plating films defining the outer terminal electrodes are preferably composed of a single metal selected from the group consisting of Cu, Ni, Sn, Pb, Au, Ag, Pd, Bi, and Zn or an alloy including the metal, for example.

Each of the lower plating films preferably has a thickness of about 1 µm to 10 µm, for example.

The upper plating films defining the outer terminal electrodes are composed of a metal material appropriately selected in accordance with the mounting arrangement of the laminated electronic component.

For example, when the laminated electronic component (laminated ceramic electronic component) is mounted by soldering, the upper plating films are preferably made of a material, such as Ni, for example, with which plating films that function as solder barriers can be provided, and a material, such as Sn, for example, with which plating films having excellent solder wettability can be provided.

For example, when the laminated electronic component is mounted by wire bonding, the upper plating films are preferably made of Au, for example. When the laminated electronic component is to be embedded in a substrate, the upper plating films are preferably made of Cu, for example.

Hereinafter, a method for manufacturing the laminated ceramic capacitor according to the first preferred embodiment of the present invention is described.

(1) Ceramic green sheets and a conductive paste for forming inner electrodes are prepared. The ceramic green sheets and the conductive paste include a binder and a solvent. The binder and solvent can preferably be appropriately selected from known organic binders and known organic solvents, respectively.

(2) The conductive paste is printed on a desired number of the ceramic green sheets (first ceramic green sheets) in desired patterns by screen printing or other suitable method. Thus, inner electrode patterns are formed.

(3) A mother laminate is prepared by laminating the ceramic green sheets in a desired order. In the mother laminate, the first ceramic green sheets on which the inner electrode patterns are printed are laminated, and a number of the ceramic green sheets (second ceramic green sheets) which do not include any inner electrode patterns or inner conductor patterns are laminated to sandwich the laminate of the first ceramic green sheets. If necessary, the mother laminate is compacted in the direction of the lamination by isostatic pressing or other suitable method.

(4) The resultant green mother laminate is cut into a desired size to prepare green capacitor bodies.

(5) Then, each green capacitor body is fired. The firing temperature depends on the type of a ceramic defining the ceramic green sheets or a material defining the inner electrodes. In general, the firing is preferably conducted at about 900° C. to about 1300° C., for example.

(6) If necessary, the resultant capacitor body is polished by barrel polishing, for example, to shape the exposed portions of the inner electrodes. At this time, chamfering is simultaneously conducted and, as a result, edge portions and corner portions of the capacitor body are rounded. If necessary, the capacitor body is made water-repellent in advance to prevent entry of a plating solution into the capacitor body through gaps between the exposed portions of the inner electrodes and dielectric layers.

(7) The capacitor body is plated. Specifically, as shown in FIG. 4, the lower plating films 1a and 2a are formed by depositing metal particles on the exposed portions of the first inner electrodes 41 and the second inner electrodes 42, respectively.

When the first surface conductors 13 and the second surface conductors 14 (see FIG. 2) are formed, these surface conductors 13 and 14 may be formed by printing surface conductor patterns on ceramic green sheets for the outermost layers of the ceramic assembly in advance and firing the surface conductor patterns and the ceramic assembly simultaneously. Alternatively, the surface conductors 13 and 14 may be formed by printing surface conductors on the main surfaces of the fired ceramic assembly and subsequently firing the printed surface conductors.

Each of the lower plating films 1a and 2a is formed by forming a Cu strike plating film by conducting strike plating directly on an end surface of the capacitor body 10 and forming a thick Cu plating film by electrolytically plating Cu on the Cu strike plating film. Herein, the thick Cu plating films, which define the lower plating films 1a and 2a, are preferably composed of Cu particles having an average size of about 0.5 µm or less, for example.

As described above, in the present preferred embodiment, each of the lower plating films 1a and 2a is preferably formed by forming a Cu strike plating film and subsequently forming a thick Cu plating film on the Cu strike plating film. Alternatively, each of the lower plating films 1a and 2a can be formed by forming a thick Cu plating film on an end surface of the capacitor body 10 without forming a Cu strike plating film.

In the first preferred embodiment, the formation of the lower plating films (thick Cu plating films) composed of Cu particles having an average size of about 0.5 µm or less facilitates the removal of moisture and other contaminants from the inside of the capacitor body.

To sufficiently provide channels for removing moisture and other contaminants from the inside of the capacitor body, the Cu strike plating film and the thick Cu plating film is preferably composed of Cu particles having an average size of about 0.5 µm or less.

(8) Subsequently, the first upper plating film 1b (2b) composed of a Ni plating film is formed by electrolytically plating the lower plating film 1a (2a) with Ni. The second upper plating film 1c (2c) composed of a Sn plating film is formed by electrolytically plating the first upper plating film 1b (2b) with Sn. To sufficiently provide channels for removing moisture and other contaminants from the inside of the capacitor body, the first upper plating film 1b (2b) and the second upper plating film 1c (2c) are also composed of metal particles having an average size of about 0.5 µm or less, for example.

(9) Then, the capacitor body 10 having the outer terminal electrodes formed thereon is heat-treated at about 300° C. for about 2 hours, for example. Moisture and other contaminant are removed from the inside of the electronic component body during this heat treatment and, as a result, a laminated ceramic capacitor with high reliability is produced.

The laminated ceramic capacitor shown in FIGS. 1 and 2 is manufactured by the steps described above. In the above-described method for manufacturing a laminated ceramic capacitor, plating for forming outer terminal electrodes may be performed by electrolytic plating or electroless plating. However, electrolytic plating is preferred because improvement of the deposition rate in electroless plating requires a pretreatment using a catalyst, which complicates the processing.

In the above-described method for manufacturing a laminated ceramic capacitor, plating is preferably conducted by barrel plating in which a capacitor body is disposed in a barrel and the capacitor body is plated while the barrel is rotated. Alternatively, other plating techniques may also be used.

Second Preferred Embodiment

Figure 5:
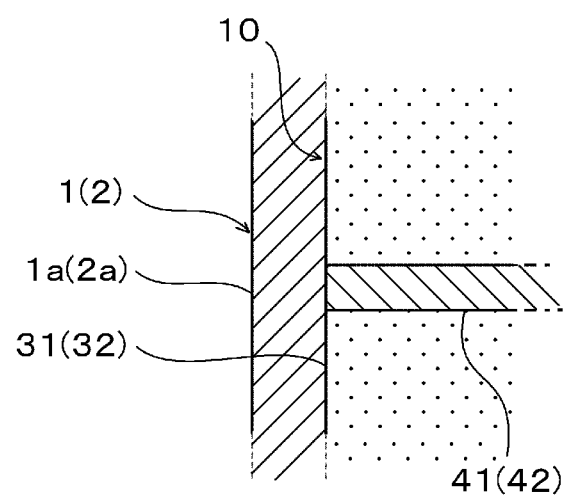
FIG. 5 is an enlarged view showing the configuration of a main portion of a laminated ceramic capacitor according to a second preferred embodiment of the present invention.

FIG. 5 is an enlarged view of a main portion of a laminated ceramic capacitor according to a second preferred embodiment of the present invention. The configuration and materials of the laminated ceramic capacitor according to the second preferred embodiment is substantially the same as those of the laminated ceramic capacitor according to the first preferred embodiment except that the first outer terminal electrode 1 is defined only by the lower plating film 1a and the second outer terminal electrode 2 is defined only by the lower plating film 2a.

FIG. 5 shows a main portion at which the first outer terminal electrode 1 on the first end surface 31 of the capacitor body 10 is connected to the first inner electrodes 41. Since this portion and a portion at which the second outer terminal electrode 2 (see FIGS. 1 and 2) is connected to the second inner electrodes 42 are symmetric, FIG. 5 is also used to show the latter portion with reference numerals in parentheses, i.e., the lower plating film 2a that defines the second outer terminal electrode 2 and the second inner electrode 42.

The laminated ceramic capacitor according to the second preferred embodiment can also be manufactured by a method similar to the above-described method for manufacturing the laminated ceramic capacitor according to the first preferred embodiment.

Note that, in the step of forming the outer terminal electrodes, the formation of the upper plating films on the lower plating films is not required.

Third Preferred Embodiment

Figure 6:
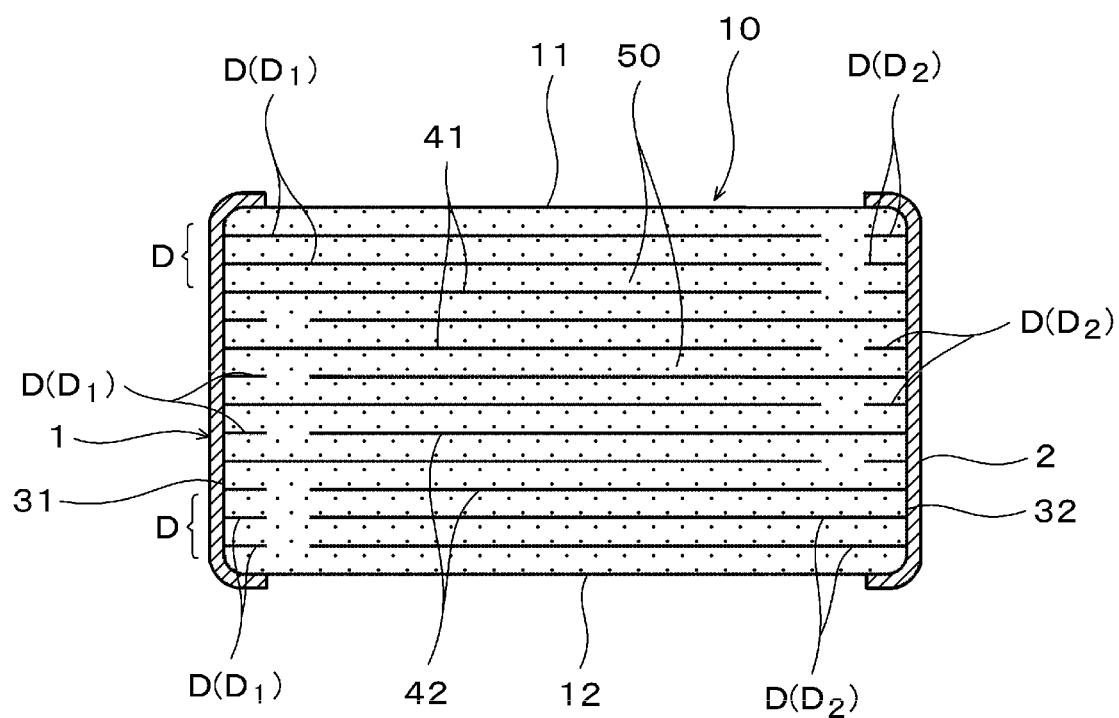
FIG. 6 is a section view showing the configuration of a laminated ceramic capacitor according to a third preferred embodiment of the present invention.

FIG. 6 shows a laminated ceramic capacitor according to a third preferred embodiment. The laminated ceramic capacitor according to the third preferred embodiment is substantially the same as the laminated ceramic capacitor according to the first preferred embodiment except that the capacitor body 10 includes dummy inner electrodes D ($D_1$ and $D_2$). In FIG. 6, portions designated by reference numerals that are the same as those in FIG. 2 correspond to the same portions in FIG. 2.

The laminated ceramic capacitor includes the dummy electrodes D defined by first dummy inner electrodes $D_1$ extending to and exposed at the first end surface 31 and second dummy inner electrodes $D_2$ extending to and exposed at the second end surface 32. The first dummy inner electrodes $D_1$ and the second dummy inner electrodes $D_2$ are arranged in the planes in which the inner electrodes 41 and 42 are formed, the inner electrodes 41 and 42 being arranged between the dielectric layers 50. Additionally, the first dummy inner electrodes $D_1$ and the second dummy inner electrodes $D_2$ are also provided in outer layer regions of the capacitor body 10 in which no inner electrodes are provided, the outer layer regions sandwiching, in the direction of the lamination, the region in which the inner electrodes are provided.

The laminated ceramic capacitor according to the third preferred embodiment can also be manufactured by a method similar to the method for manufacturing the laminated ceramic capacitor according to the first preferred embodiment.

Note that, in manufacturing of the laminated ceramic capacitor according to the third preferred embodiment, at least two types of ceramic green sheets are prepared and laminated in a desired order. The ceramic green sheets of one type are used for functional layers and include inner electrode patterns and dummy inner electrode patterns. The ceramic green sheets of another type are used for outer layers of the capacitor body and include only dummy inner electrode patterns. Optionally, ceramic green sheets on which neither inner electrode patterns nor dummy inner electrode patterns are provided may be arranged in the laminate of the above-described ceramic green sheets.

Fourth Preferred Embodiment

Figure 7:
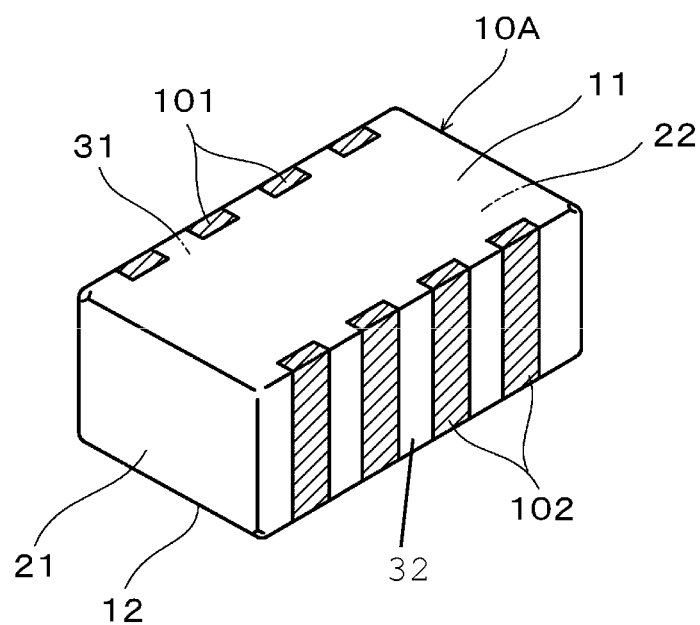
FIG. 7 is a perspective view showing the outer configuration of an array-type laminated ceramic capacitor (capacitor array) according to a fourth preferred embodiment of the present invention.
Figure 8:
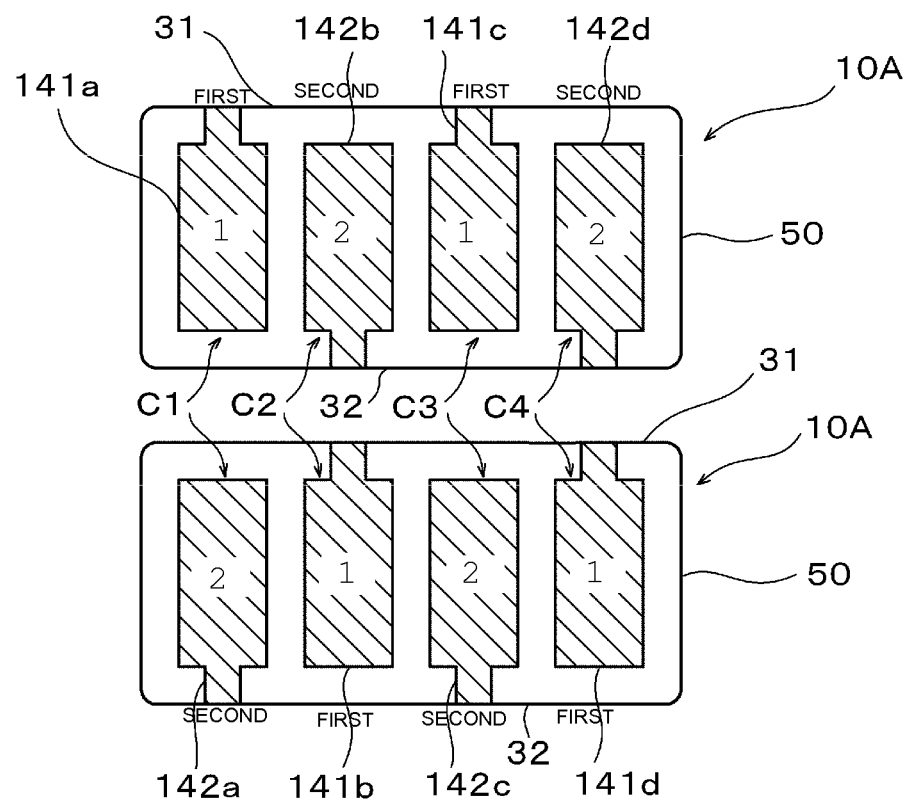
FIG. 8 shows the arrangement pattern of a plurality of inner electrodes of the array-type laminated ceramic capacitor according to the fourth preferred embodiment of the present invention.

FIG. 7 shows an array-type laminated ceramic capacitor (capacitor array) according to a fourth preferred embodiment of the present invention. FIG. 8 illustrates the arrangement of the inner electrodes of the capacitor array. Referring to FIG.

7, the array-type laminated ceramic capacitor according to the fourth preferred embodiment includes a capacitor array body 10A that is substantially a rectangular parallelepiped and includes a first main surface 11 and a second main surface 12 facing each other, a first side surface 21 and a second side surface 22 facing each other, and a first end surface 31 and a second end surface 32 facing each other.

A plurality of first outer terminal electrodes 101 are provided on the first end surface 31 of the capacitor array body 10A. A plurality of second outer terminal electrodes 102 are provided on the second end surface 32 of the capacitor array body 10A. The first outer terminal electrodes 101 and the second outer terminal electrodes 102 are electrically insulated from each other.

Referring to FIG. 8, the capacitor array body 10A includes a plurality of first inner electrodes 141a, 141b, 141c, and 141d and a plurality of second inner electrodes 142a, 142b, 142c, and 142d, the first inner electrodes and the second inner electrodes facing one another with dielectric layers 50 therebetween. Specifically, when viewed in a plane parallel or substantially parallel to the main surfaces 11 and 12, the first inner electrodes 141a, 141b, 141c, and 141d and the second inner electrodes 142a, 142b, 142c, and 142d are alternately arranged in the longitudinal direction of the capacitor array body 10A. When viewed in the direction of the lamination, one of the first inner electrodes 141 and one of the second inner electrodes 142 are arranged to face each other with the dielectric layer 50 therebetween. As shown in FIG. 8, the first inner electrodes 141a, 141b, 141c, and 141d extend to and are exposed at the first end surface 31 and are electrically connected to the first outer terminal electrodes 101. The second inner electrodes 142a, 142b, 142c, and 142d extend to and are exposed at the second end surface 32 and are electrically connected to the second outer terminal electrodes 102.

The array-type laminated ceramic capacitor according to the fourth preferred embodiment includes four capacitor portions C1, C2, C3, and C4 arranged in the longitudinal direction of the capacitor array body 10A. Each of the capacitor portions are defined by one of the first inner electrodes 141 and one of the second inner electrodes 142 facing each other with the dielectric layers 50 therebetween.

The outer terminal electrodes of the laminated ceramic capacitor array according to the fourth preferred embodiment have the same or substantially the same configuration as in the first preferred embodiment. Specifically, each of the outer terminal electrodes is defined by a lower plating film and an upper plating film defined by a first upper plating film composed of a Ni plating film and a second upper plating film composed of a Sn plating film.

The laminated ceramic capacitor (capacitor array) according to the fourth preferred embodiment may also be manufactured by a method similar to the above-described method for manufacturing the laminated ceramic capacitor according to the first preferred embodiment. Note that, in manufacturing of the laminated ceramic capacitor according to the fourth preferred embodiment, ceramic green sheets on which inner electrode patterns corresponding to the shape of inner electrode are arranged are used and outer terminal electrodes are formed on outer surfaces of a capacitor array body to cover exposed portions of the inner electrodes.

Fifth Preferred Embodiment

Figure 9:
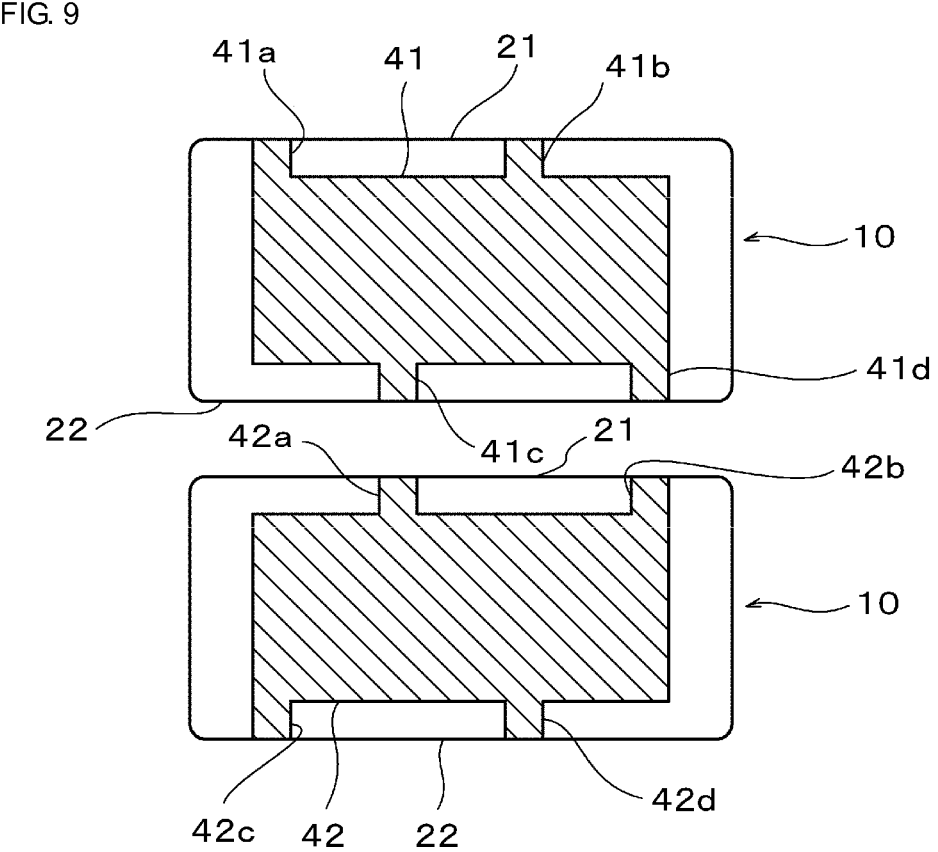
FIG. 9 shows a multiple-terminal low-ESL laminated ceramic capacitor according to a fifth preferred embodiment of the present invention.

FIG. 9 illustrates the pattern of inner electrodes of a multiple-terminal low-ESL laminated ceramic capacitor according to a fifth preferred embodiment of the present invention.

In the laminated ceramic capacitor according to the fifth preferred embodiment, a first inner electrode 41 has a plurality of (four in the fifth preferred embodiment) protrusions 41a, 41b, 41c, and 41d, and a second inner electrode 42 has a plurality of (four in the fifth preferred embodiment) protrusions 42a, 42b, 42c, and 42d.

As shown in FIG. 9, the protrusions 41a, 41b, 41c, and 41d of the first inner electrode 41 and the protrusions 42a, 42b, 42c, and 42d of the second inner electrode 42 are arranged in a pattern in first side surfaces 21 and in second side surfaces 22. Specifically, in plan view, (a) the protrusion 41b, which is one of the protrusions of the first inner electrode 41, is arranged between the protrusions 42a and 42b of the second inner electrode 42; (b) the protrusion 41c, which is another one of the protrusions of the first inner electrode 41 is arranged between the protrusions 42c and 42d of the second inner electrode 42; (c) the protrusion 42a, which is one of the protrusions of the second inner electrode 42 is arranged between the protrusions 41a and 41b of the first inner electrode 41; and (d) the protrusion 42d, which is another one of the protrusions of the second inner electrode 42 is arranged between the protrusions 41c and 41d of the first inner electrode 41.

In the laminated ceramic capacitor according to the fifth preferred embodiment, outer terminal electrodes are also arranged (not shown) to cover the protrusions (exposed portions) of the first inner electrode and the second inner electrode, the protrusions being exposed at the side surfaces of the capacitor body.

In the laminated ceramic capacitor according to the fifth preferred embodiment, the outer terminal electrodes may also have the same or substantially the same configuration as in the first preferred embodiment. The laminated ceramic capacitor according to the fifth preferred embodiment may also be manufactured by a method similar to the above-described method for manufacturing the laminated ceramic capacitor according to the first preferred embodiment. Note that, in manufacturing of the laminated ceramic capacitor according to the fifth preferred embodiment, ceramic green sheets on which inner electrode patterns corresponding to the shape of inner electrodes are arranged are used and outer terminal electrodes are provided on the side surfaces of a capacitor body to cover exposed portions of the inner electrodes.

EXAMPLE 1

Hereinafter, the present invention is described in more detail with reference to examples of preferred embodiments of the present invention.

Laminated ceramic capacitors having the following specifications were manufactured by a method similar to the above-described method for manufacturing the laminated ceramic capacitor according to the first preferred embodiment.

1. Dimensions
Length L=2.0 mm
Width W=1.25 mm
Height T=1.25 mm
2. Material defining dielectric layers: barium titanate dielectric ceramic
3. Main component of material defining inner electrodes: Ni
4. Number of laminated layers: 416 (thickness of each dielectric layer: about 1.9 μm)
5. Rated voltage: about 6.3 V
6. Capacitance: about 10 μF Note that, as described below, each outer terminal electrodes including the following lower plating film was formed by directly plating a capacitor body.

Configuration of Outer Terminal Electrodes
(a) Lower Plating Film

The lower plating film is defined by a Cu strike plating film and a thick Cu plating film formed by electrolytically plating the Cu strike plating film with Cu. The target thickness of the lower plating film was about 10 μm.

Hereinafter, the formation of the outer terminal electrodes is described in detail.

Plating Bath
(1) Plating Bath for Forming Lower Plating Film
(a) The Cu strike plating film defining the lower plating film was formed with a plating bath satisfying the following conditions.

Copper pyrophosphate: about 14 g/L
Pyrophosphoric acid: about 120 g/L
Potassium oxalate: about 10 g/L
Particle size controlling agent (ammonium-based additive): certain amount (see Table 1)
pH: about 8.5
Temperature: about 25° C.

As shown in Table 1, the average size of metal particles (Cu particles) defining the Cu strike plating film was changed by changing the amount of the ammonium-based additive added in the range shown as conditions 1 to 5 in Table 1.

TABLE 1

| Conditions | Amount of particle size controlling agent added (ml/L) | Average size of Cu particles constituting Cu strike plating film (μm) |
|---|---|---|
| 1 | 2.6 | 0.3 |
| 2 | 2.4 | 0.4 |
| 3 | 2.2 | 0.5 |
| 4 | 2.0 | 0.6 |
| 5 | 1.8 | 0.7 |

(b) The thick Cu plating film defining the lower plating film was formed with a plating bath satisfying the following conditions. Component of plating bath: PYROBRITE PROCESS manufactured by C. Uyemura & Co., Ltd.
Particle size controlling agent (ammonium-based additive): certain amount (see Table 2)
pH: about 8.8
Temperature: about 55° C.

As shown in Table 2, the average size of metal particles (Cu particles) defining the thick Cu plating film was changed by changing the amount of the ammonium-based additive added in the range shown as conditions 6 to 10 in Table 2.

TABLE 2

| Conditions | Amount of particle size controlling agent added (ml/L) | Average size of Cu particles constituting thick Cu plating film (μm) |
|---|---|---|
| 6 | 3.0 | 0.3 |
| 7 | 2.8 | 0.4 |
| 8 | 2.6 | 0.5 |
| 9 | 2.4 | 0.6 |
| 10 | 2.2 | 0.7 |

Plating Technique, Plating Conditions, and the Like
Plating technique: horizontal-rotated barrel plating
Rotation speed of barrel: about 10 rpm
Size of conductive medium: diameter of about 1.8 mm (conductive medium)
Current Density×Time
Cu strike plating: about 0.11 A/dm$^2$×60 min
Cu (thick) plating: about 0.30 A/dm$^2$×60 min In Example 1, the Cu strike plating films and the thick Cu plating films were formed by electrolytic plating. However, methods for forming these plating films are not particularly restricted. Electroless plating can be used to form plating films such as a Cu electroless plating film, Ni—P electroless plating film, and Ni—B electroless plating film, for example. When electroless plating is performed and the material of an inner electrode does not have catalytic activity, the inner electrode must be subjected to a catalytic activation treatment.

Lower plating films including Cu strike plating films and thick Cu plating films composed of metal particles (Cu particles) having an average size shown in Table 3 were formed using some of the conditions in Tables 1 and 2.

Subsequently, capacitor bodies including the lower plating films were heat-treated at about 300° C. for about 2 hours. Thus, samples (laminated ceramic capacitors) corresponding to Sample Nos. 1 to 11 in Table 3 were manufactured.

Evaluation of Properties

The Samples 1 to 11 were subjected to a high temperature loading test to evaluate reliability of the Samples. Test conditions are described below.

Temperature: about 125° C.
Applied voltage: about 12.6 V (rated voltage: about 2 WV)
Test period: about 2000 hours After the samples were subjected to the high temperature loading conditions, the resistance of the samples was measured and samples having a reduced insulation resistance of about 1 MΩ or less were counted as defective samples. The proportion of the defective samples was calculated with the following equation.

Proportion of defective samples (%)=(the number of defective samples/the total number of samples)×100

The thus-obtained calculation results are also shown in Table 3. In Table 3, Samples whose sample numbers are marked with "*" had a lower plating film including a Cu strike plating film and a thick Cu plating film one of which was composed of Cu particles having an average size greater than about 0.5 μm.

The number (N) of samples evaluated for each Sample was 100.

TABLE 3

| Sample number | Average size of Cu particles constituting Cu strike plating film (μm) | Average size of Cu particles constituting thick Cu plating film (μm) | Proportion of defective samples (%) (number of defective samples/total number of samples) |
|---|---|---|---|
| 1 | 0.3 | 0.3 | 0 (0/100) |
| 2 | 0.3 | 0.4 | 0 (0/100) |
| 3 | 0.3 | 0.5 | 0 (0/100) |
| *4 | 0.3 | 0.6 | 2 (2/100) |
| *5 | 0.3 | 0.7 | 5 (5/100) |
| 6 | 0.4 | 0.3 | 0 (0/100) |
| 7 | 0.5 | 0.3 | 0 (0/100) |
| *8 | 0.6 | 0.3 | 2 (4/100) |
| *9 | 0.7 | 0.3 | 4 (4/100) |

TABLE 3-continued

| Sample number | Average size of Cu particles constituting Cu strike plating film (μm) | Average size of Cu particles constituting thick Cu plating film (μm) | Proportion of defective samples (%) (number of defective samples/total number of samples) |
|---|---|---|---|
| 10 | 0.5 | 0.5 | 0 (0/100) |
| *11 | 0.5 | 0.6 | 3 (3/100) |

As shown in Table 3, Sample Nos. 4, 5, 8, 9, and 11, in which Cu particles defining a Cu strike plating film or a thick Cu plating film did not satisfy the average size requirement of about 0.5 μm or less, had defective samples.

In contrast, Sample Nos. 1, 2, 3, 6, 7, and 10, in which Cu particles defining both a Cu strike plating film and a thick Cu plating film satisfied the average size requirement of about 0.5 μm or less, had no defective samples. Thus, it has been established that these Samples had high reliability.

In Example 1, laminated ceramic capacitors were used as examples to describe a preferred embodiment of the present invention. However, the present invention is not restricted to laminated ceramic capacitors and is also applicable to various laminated electronic components having a configuration in which an electronic component body includes an inner conductor and an outer terminal electrode provided on a surface of the electronic component body such that the outer terminal electrode is electrically connected to the inner conductor. Examples of such laminated electronic devices may include multilayer chip inductors and multilayer chip thermistors.

In Example 1, a preferred embodiment of the present invention was described by using, as an example, a case in which the electronic component body was composed of a dielectric ceramic. However, the present invention is not restricted thereto. An electronic component body may be composed of a dielectric ceramic, a piezoelectric ceramic, a semiconductor ceramic, a magnetic ceramic, for example. Alternatively, an electronic component body may also be composed of a substance containing a resin, for example.

The present invention is also not restricted to the preferred embodiments and example described above in terms of features other than those described above. Various changes and modifications can be made in the scope of the present invention, for example, the material for forming inner conductors or outer terminal electrodes, a method for forming outer terminal electrodes, a material for forming upper plating films defining outer terminal electrodes, the number of layers of upper plating films defining outer terminal electrodes, and a method for forming upper plating films defining outer terminal electrodes.

As described above, according to preferred embodiments of the present invention, the reliability of a laminated electronic component including an outer terminal electrode formed by direct plating can be improved. Therefore, the present invention is widely applicable to various laminated electronic components having a configuration in which an electronic component body includes an inner conductor and an outer terminal electrode formed by directly plating a surface of the electronic component body such that the outer terminal electrode is electrically connected to the inner conductor.

While preferred embodiments of the present invention have been described above, it is to be understood that variations and modifications will be apparent to those skilled in the art without departing the scope and spirit of the invention. The scope of the present invention, therefore, is to be determined solely by the following claims.

What is claimed is:

1. A laminated electronic component comprising:
   an electronic component body including a plurality of laminated functional layers;
   an inner conductor provided in the electronic component body and including a portion exposed at an outer surface of the electronic component body; and
   an outer terminal electrode arranged on the outer surface of the electronic component body such that the outer terminal electrode is electrically connected to the inner conductor and
   the outer terminal electrode covers the exposed portion of the inner conductor; wherein the outer terminal electrode includes a lower plating film that is directly plated on the outer surface of the electronic component body so as to cover the exposed portion of the inner conductor;
   the lower plating film is directly connected to the exposed portion of the inner conductor;
   the lower plating film includes first metal particles having an average size of about 0.5 μm or less;
   the lower plating film is made of a material that is not fired or sintered; and
   the lower plating film has a thickness of about 1 μm to about 10 μm.

2. The laminated electronic component according to claim 1, wherein the outer terminal electrode further includes an upper plating film disposed on the lower plating film, and the upper plating film includes at least one layer.

3. The laminated electronic component according to claim 2, wherein the upper plating film includes second metal particles having an average size of about 0.5 μm or less.

4. The laminated electronic component according to claim 2, wherein the upper plating film includes second metal particles having an average size substantially equal to or greater than the average size of the first metal particles of the lower plating film.

5. The laminated electronic component according to claim 1, wherein the first metal particles of the lower plating film are Cu particles.

6. A laminated electronic component comprising:
   an electronic component body including a plurality of laminated functional layers;
   an inner conductor provided in the electronic component body and including a portion exposed at an outer surface of the electronic component body; and
   an outer terminal electrode arranged on the outer surface of the electronic component body such that the outer terminal electrode is electrically connected to the inner conductor and
   the outer terminal electrode covers the exposed portion of the inner conductor; wherein the outer terminal electrode includes a lower plating film that is directly plated on the outer surface of the electronic component body so as to cover the exposed portion of the inner conductor;
   the lower plating film is directly connected to the exposed portion of the inner conductor;
   the lower plating film includes first metal particles having an average size of about 0.5 μm or less;
   the lower plating film does not include any glass; and
   the lower plating film has a thickness of about 1 μm to about 10 μm.

7. The laminated electronic component according to claim 6, wherein the outer terminal electrode further includes an upper plating film disposed on the lower plating film, and the upper plating film includes at least one layer.

8. The laminated electronic component according to claim 7, wherein the upper plating film includes second metal particles having an average size of about 0.5 μm or less.

9. The laminated electronic component according to claim 7, wherein the upper plating film includes second metal particles having an average size substantially equal to or greater than the average size of the first metal particles of the lower plating film.

10. The laminated electronic component according to claim 6, wherein the first metal particles of the lower plating film are Cu particles.

11. A laminated electronic component comprising:
an electronic component body including a plurality of laminated functional layers;
an inner conductor provided in the electronic component body and including a portion exposed at an outer surface of the electronic component body; and
an outer terminal electrode arranged on the outer surface of the electronic component body such that the outer terminal electrode is electrically connected to the inner conductor and the outer terminal electrode covers the exposed portion of the inner conductor; wherein the outer terminal electrode includes a lower plating film that is directly plated on the outer surface of the electronic component body so as to cover the exposed portion of the inner conductor;

the lower plating film is directly connected to the exposed portion of the inner conductor;

the lower plating film includes metal particles having an average size of about 0.5 μm or less; and the lower plating film consists of metal; and the lower plating film has a thickness of about 1 μm to about 10 μm.

* * * * *